United States Patent
Tedaldi et al.

(10) Patent No.: US 10,771,313 B2
(45) Date of Patent: Sep. 8, 2020

(54) USING RANDOM FORESTS TO GENERATE RULES FOR CAUSATION ANALYSIS OF NETWORK ANOMALIES

(71) Applicant: Cisco Technology, Inc., San Jose, CA (US)

(72) Inventors: David Tedaldi, Zurich (CH); Grégory Mermoud, Veyras (CH); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/881,909

(22) Filed: Jan. 29, 2018

(65) Prior Publication Data
US 2019/0238396 A1 Aug. 1, 2019

(51) Int. Cl.
*H04L 12/24* (2006.01)

(52) U.S. Cl.
CPC ...... *H04L 41/0636* (2013.01); *H04L 41/0654* (2013.01); *H04L 41/16* (2013.01); *H04L 41/5025* (2013.01)

(58) Field of Classification Search
CPC . H04L 63/1425; H04L 43/062; H04L 63/105; H04L 63/102; H04L 63/1416; H04L 43/12; G06F 16/245; H04W 12/1201
See application file for complete search history.

(56) References Cited

U.S. PATENT DOCUMENTS

| | | | |
|---|---|---|---|
| 6,321,338 B1 * | 11/2001 | Porras | H04L 41/142 709/224 |
| 7,523,016 B1 * | 4/2009 | Surdulescu | G06F 21/316 702/185 |
| 8,204,974 B1 | 6/2012 | Bhattacharyya et al. | |
| 10,045,218 B1 * | 8/2018 | Stapleton | H04W 12/12 |
| 2006/0173992 A1 * | 8/2006 | Weber | H04L 63/1425 709/224 |
| 2011/0185422 A1 * | 7/2011 | Khayam | H04L 63/1425 726/23 |
| 2012/0311664 A1 * | 12/2012 | Elrod | H04L 63/0227 726/1 |
| 2013/0198119 A1 * | 8/2013 | Eberhardt, III | G06N 20/00 706/12 |
| 2014/0325649 A1 * | 10/2014 | Zhang | H04L 43/024 726/23 |
| 2016/0028762 A1 | 1/2016 | Di Pietro et al. | |
| 2016/0219070 A1 | 7/2016 | Vasseur et al. | |
| 2017/0063888 A1 * | 3/2017 | Muddu | G06F 17/2235 |
| 2018/0032862 A1 * | 2/2018 | Oliner | G06N 3/0445 |

* cited by examiner

*Primary Examiner* — Aftab N. Khan
(74) *Attorney, Agent, or Firm* — Behmke Innovation Group LLC; Kenneth J. Heywood; Jonathon P. Western

(57) ABSTRACT

In one embodiment, a network assurance service receives one or more sets of network characteristics of a network, each network characteristic forming a different feature dimension in a multi-dimensional feature space. The network assurance service applies machine learning-based anomaly detection to the one or more sets of network characteristics, to label each set of network characteristics as anomalous or non-anomalous. The network assurance service identifies, based on the labeled one or more sets of network characteristics, an anomaly pattern as a collection of unidimensional cutoffs in the feature space. The network assurance service initiates a change to the network based on the identified anomaly pattern.

20 Claims, 9 Drawing Sheets

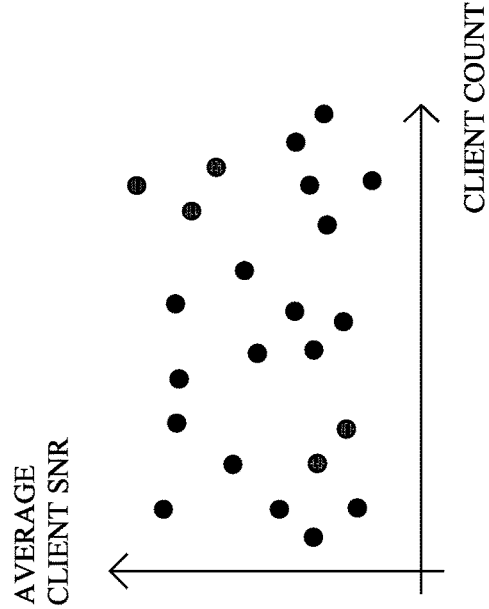
FIG. 5B
FIG. 5A

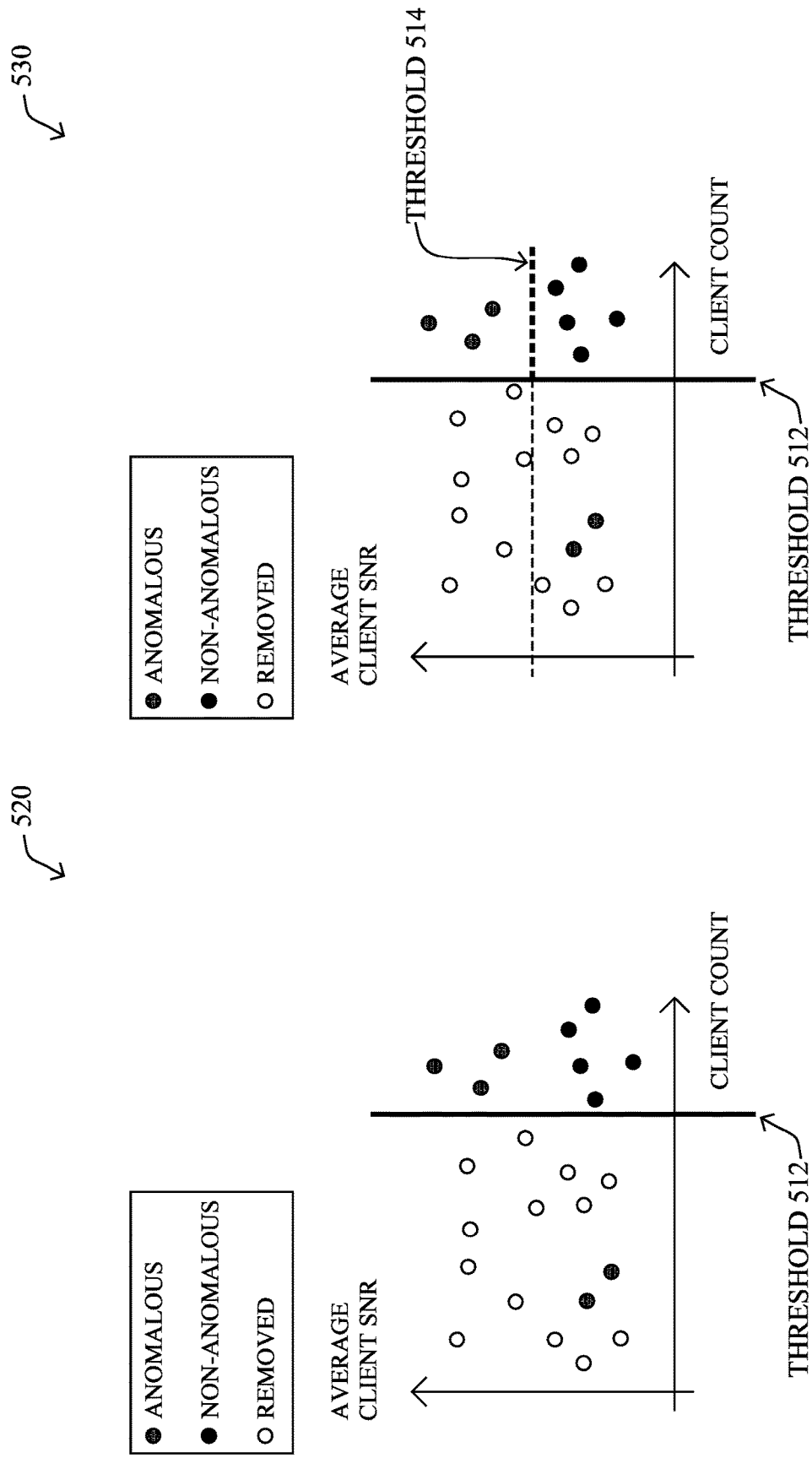

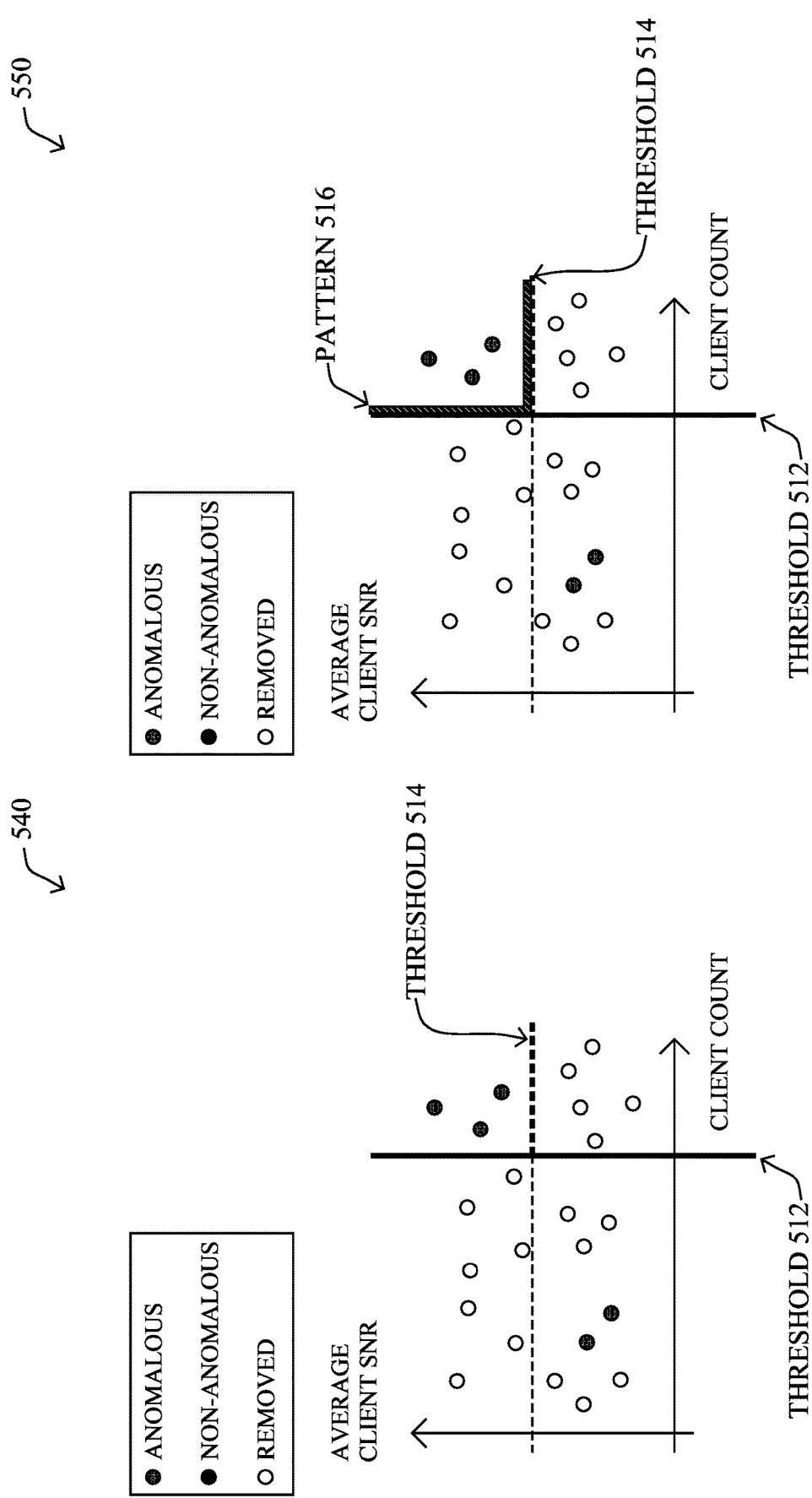

USING RANDOM FORESTS TO GENERATE RULES FOR CAUSATION ANALYSIS OF NETWORK ANOMALIES

TECHNICAL FIELD

The present disclosure relates generally to computer networks, and, more particularly, to using random forests to generate rules for causation analysis of network anomalies.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate an example of learning an anomaly pattern; and

DESCRIPTION OF EXAMPLE EMBODIMENTS

Overview

Figure 1A:
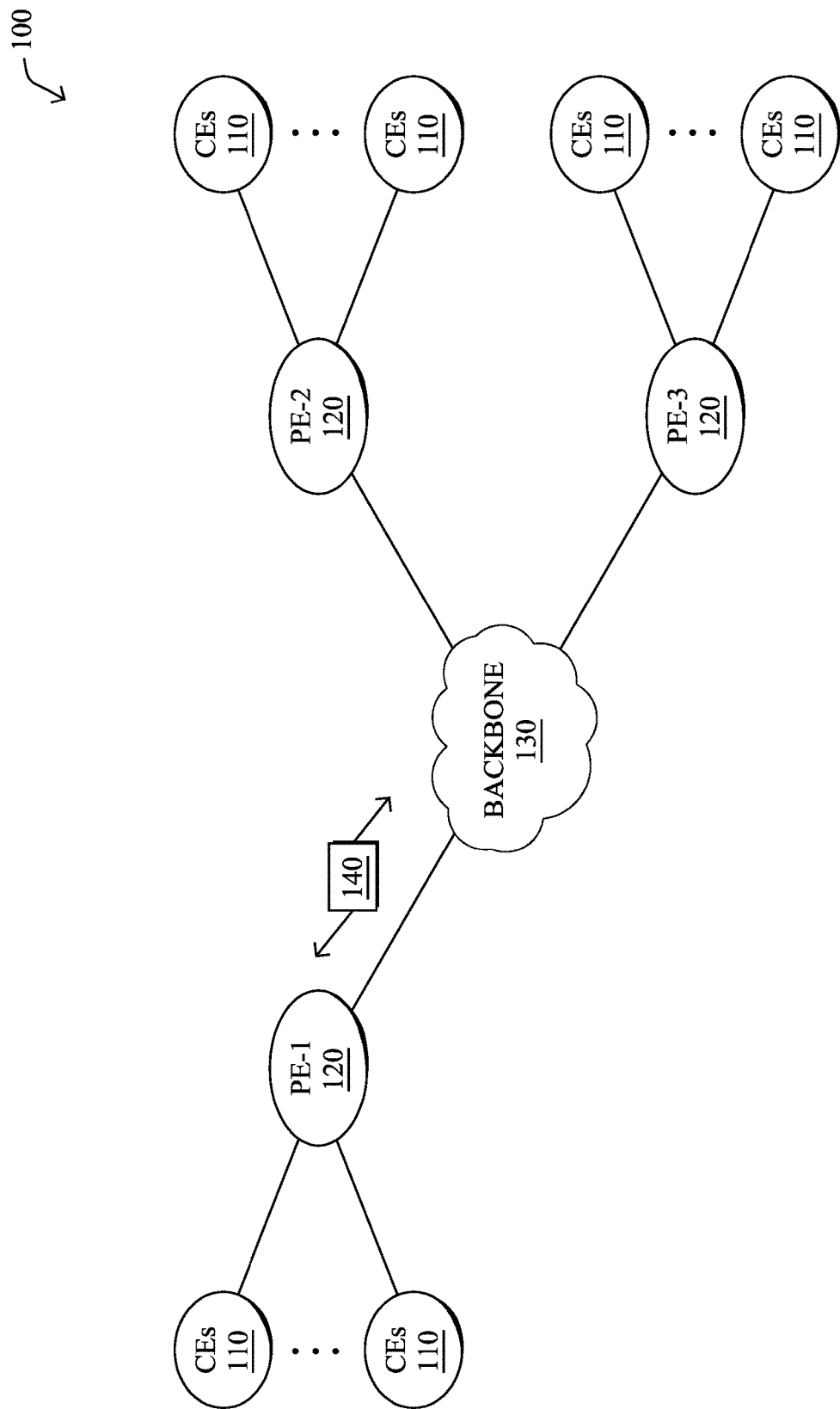
FIGS. 1A-1B illustrate an example communication network.

According to one or more embodiments of the disclosure, a network assurance service receives one or more sets of network characteristics of a network, each network characteristic forming a different feature dimension in a multi-dimensional feature space. The network assurance service applies machine learning-based anomaly detection to the one or more sets of network characteristics, to label each set of network characteristics as anomalous or non-anomalous. The network assurance service identifies, based on the labeled one or more sets of network characteristics, an anomaly pattern as a collection of unidimensional cutoffs in the feature space. The network assurance service initiates a change to the network based on the identified anomaly pattern.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
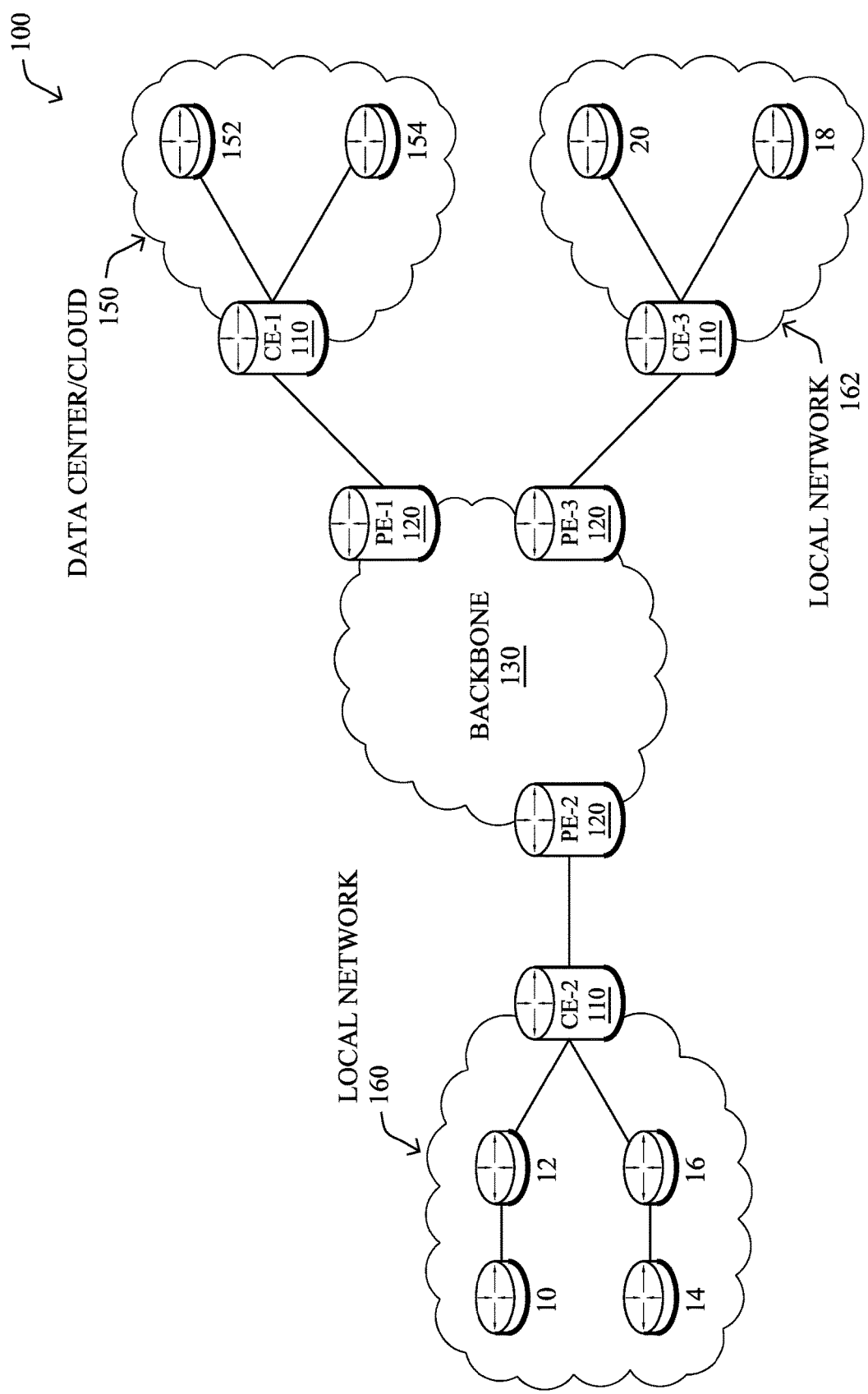

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
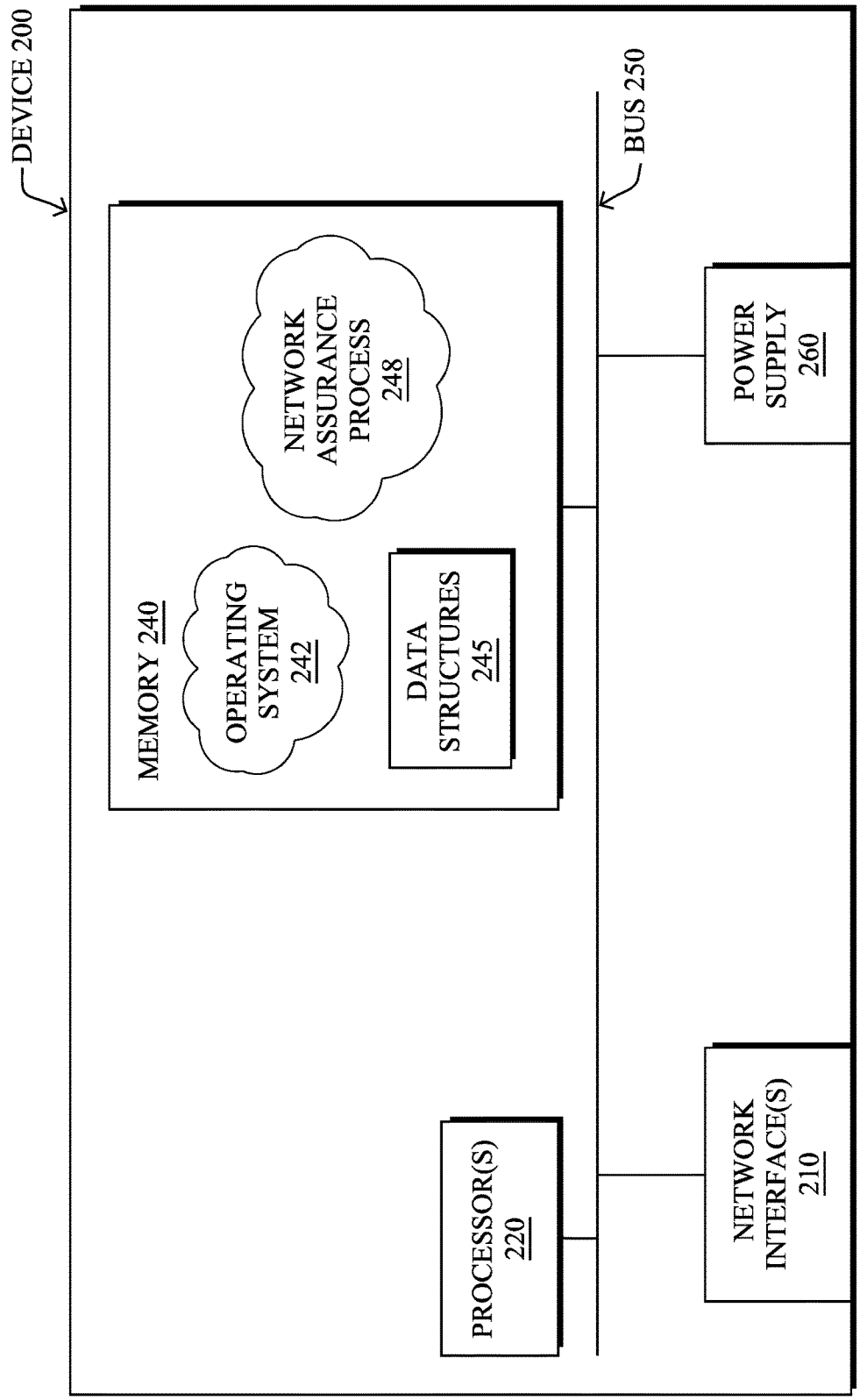
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
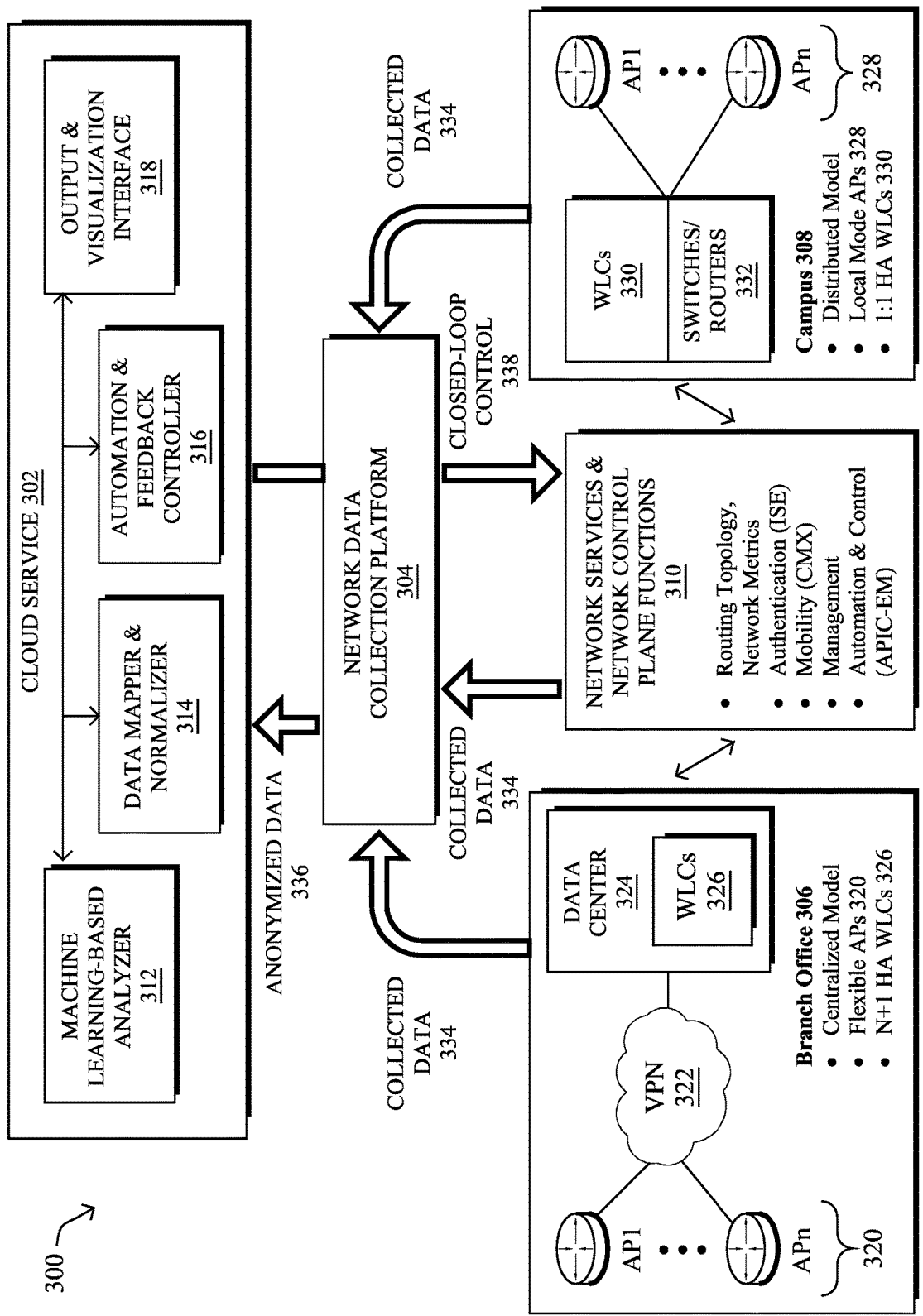
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the network assurance service introduced herein may apply machine learning-based anomaly detection to very large datasets of network characteristics (e.g., telemetry data received from one or more monitored networks, etc.). While only a small portion of these samples is typically identified as anomalous, the aggregate number of network anomalies may be quite cumbersome. Further, while anomaly detection can be quite powerful, the primary goal of anomaly detection is to identify network characteristics that are different than the norm, as opposed to distinguishing between desirable or undesirable characteristics. Indeed, while some anomalies may be indicative of an undesirable network condition underlying the anomalies, others may be benign and simply indicative of a change in the network behavior.

Often, sets of anomalies are caused by the same underlying network condition. Accordingly, the network assurance service may assess these anomalies as a single entity, which is also referred to herein as an "issue." Beyond grouping anomalies, the network assurance service may also determine some form of explanation as to why the anomalies have been grouped together. In particular, the network assurance service should provide a hint as to the underlying network conditions that were present in the network when most of the grouped anomalies were generated. Finally, the smart grouping of anomalies by the network assurance service allows the service to apply causation analysis to only a single issue.

Using Random Forests to Generate Rules for Causation Analysis of Network Anomalies The techniques herein allow a network assurance service to infer a set of optimal dimensions and dimension-specific cutoffs in a feature space of network characteristics that separate different groups of anomalies in the feature space from other samples (e.g., other forms of anomalies and/or normal samples). This approach has the potential to be applied in a centralized manner, such as in the cloud, to any number of datasets collected from networks monitored by the service. The resulting rules can then be used for each individual network and each rule can be used as a summary of the group of anomalies defined by the rule. In further aspects, the techniques herein can be used to output a collection of candidate cut-offs (e.g., unidimensional thresholds in the feature space), which can then be used as tags used by other modules performing grouping based on different analysis techniques, such as association rule mining, sequential pattern mining, or the like.

Specifically, according to one or more embodiments of the disclosure as described in detail below, a network assurance service receives one or more sets of network characteristics of a network, each network characteristic forming a different feature dimension in a multi-dimensional feature space. The network assurance service applies machine learning-based anomaly detection to the one or more sets of network characteristics, to label each set of network characteristics as anomalous or non-anomalous. The network assurance service identifies, based on the labeled one or more sets of network characteristics, an anomaly pattern as a collection of unidimensional cutoffs in the feature space. The network assurance service initiates a change to the network based on the identified anomaly pattern.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
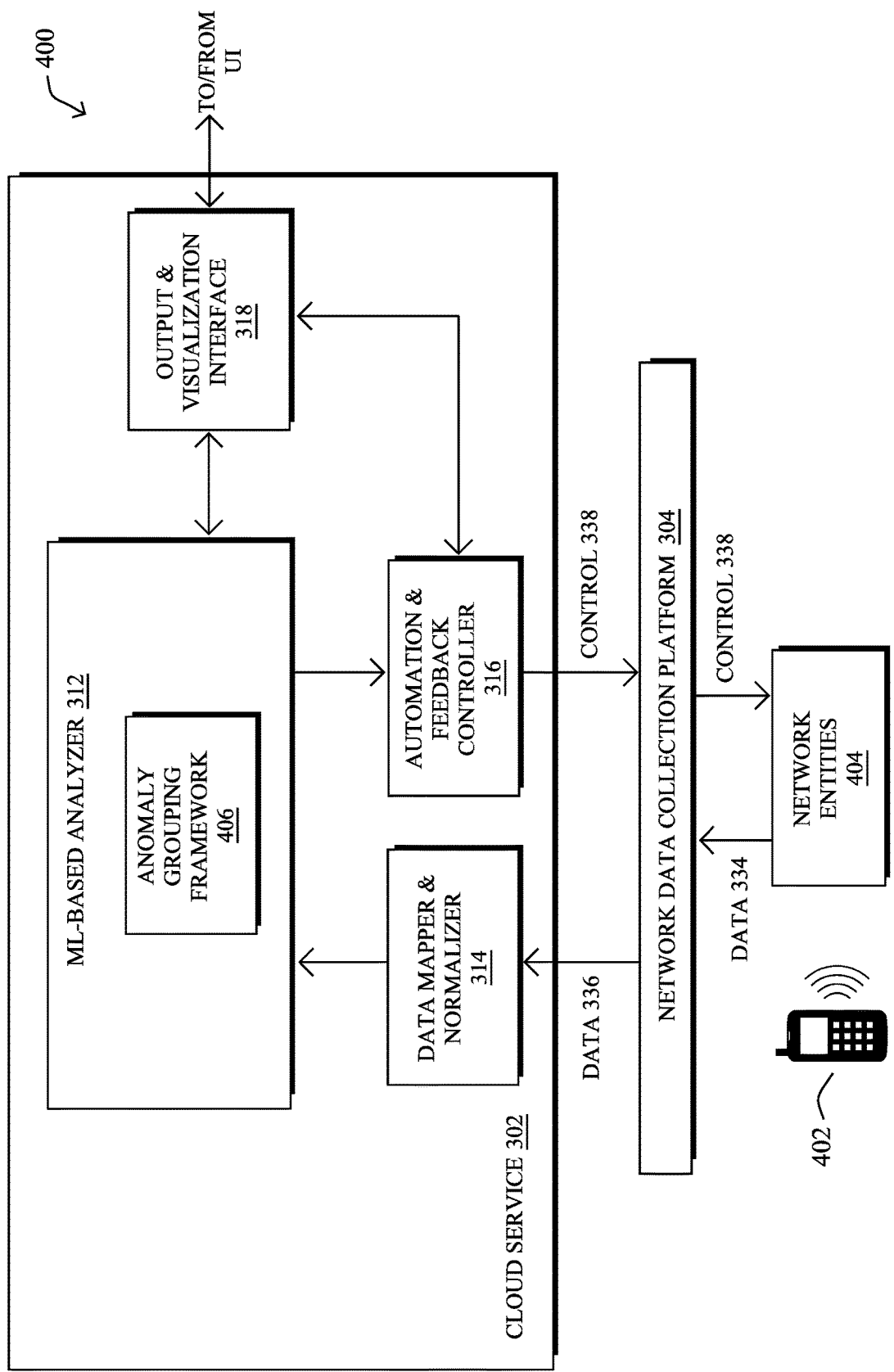
FIG. 4 illustrates an example architecture for generating rules for causation analysis of network anomalies.

Operationally, FIG. 4 illustrates an example architecture 400 for generating rules for causation analysis of network anomalies in a network assurance system, according to various embodiments. At the core of architecture 400 may be an anomaly grouping framework 406. In some implementations, the components of architecture 400 may be implemented within a network assurance system, such as system 300 shown in FIG. 3. Accordingly, anomaly causation analyzer 408 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, anomaly grouping framework 406 may be configured to take as input samples of network characteristics from the monitored network and, in turn, output anomaly patterns of detected network anomalies. For example, as shown, anomaly grouping framework 406 may receive sets of network characteristics via reported data 336 from network data collection platform 306, and potentially after undergoing transformation data mapper and normalized 314.

As would be appreciated the reported network characteristics assessed by anomaly grouping framework 406 may be indicative of the types of network entities 404 in the monitored network, their configurations (e.g., software and/or hardware versions, configured parameters, etc.), traffic information regarding the traffic in the network (e.g., volume, traffic/application type, etc.), or any other information available regarding the monitored network. For example, assume that network entities 404 are party of a wireless network that supports clients, such as client 402. In such a case, anomaly grouping framework 406 may receive as input data indicative of a client count for a given wireless access point in network entities 404, interference information for the wireless access point, data rate information for the wireless access point, channel information for the wireless access point, and/or traffic information for traffic associated with the wireless access point.

During operation, anomaly grouping framework 406 may apply one or more machine learning-based anomaly detectors to a given set of network characteristics. Such an anomaly detector may include a model of what is considered to be "normal" behavior and use this model to flag any set of characteristics that statistically deviates from this model by a threshold amount. Thus, the anomaly detector may label a given set of network characteristics as either "anomalous" or "non-anomalous/normal." In more complicated cases, the anomaly detector may use multi-class labeling, to distinguish between different severity levels of anomalies (e.g., "slightly anomalous," "highly anomalous," etc.), based on how much the set of characteristics deviates from the model of normal behavior.

Once anomaly detection framework 406 has labeled the sets of characteristics, it may identify anomaly patterns that define different sets of anomalies. In various embodiments, anomaly detection framework 406 may represent such an anomaly pattern as a set of unidimensional cutoffs (e.g., thresholds) for the feature space in which the network anomalies exist. Notably, each network characteristic in a set may fall along a different dimension in the feature space, which can comprise any number of dimensions. For example, one anomaly pattern may correspond to one or more wireless access points having more than 20 associated clients, RSSIs of 50 (on a 100 point scale), software version 2.4.5, etc., with each of these cutoffs existing along a different dimension in the feature space (e.g., client count, RSSI, software version, etc.).

Anomaly grouping framework 406 may, in some cases, also calculate and output performance metrics regarding the cutoffs of an identified anomaly pattern over the training set. More formally, assume that anomaly grouping framework 406 identifies a pattern T for anomaly A that includes N-number of cut-offs, i.e., T={$c_1, c_2, \ldots, c_N$}. In such a case, anomaly grouping framework 406 may compute any or all of, but not limited to, the following performance metrics, where 'TP' means true positives, 'FP' means false positives, and 'FN' means false negatives:

support: a measure of how frequently the pattern P appears in the dataset, which can be thought as an approximation of P(T)

precision: an estimate of P(A|T)=P(A∩T)/P(A)~TP/(TP+FP)

recall: an estimate of P(T|A)~TP/(TP+FN)

evidence: an estimate of P(A|T)/P(A) (which is equal to P(T|A)/P(T) according to Bayes)

relevance: a metric computed from user and/or expert feedback that essentially captures the probability that a user finds this pattern useful to determine the root cause pattern size: when referring to the size of a pattern, which is N in this case Anomaly grouping framework 406 may compute any or all of the above metrics for each individual cutoff $c_1$, $c_2, \ldots, c_N$, assuming that they are singleton patterns of the form T={$c_1$}.

The strength of anomaly grouping framework 406 is that it can be thought of as a full-blown anomaly grouping and summarization module, since it is producing patterns that can be used to group and consequently explain anomalies. In some embodiments, anomaly grouping framework 406 may provide data regarding a detected anomaly pattern to output and visualization interface 318 which, in turn, may send the anomaly pattern information as display data to a user interface (UI). In further cases, anomaly grouping framework 406 may also serve as an effective miner of candidate cut-offs (or tags) that can be used as input to any other data mining algorithm, such as FP-Growth, Apriori, etc.

The fundamental idea behind the anomaly pattern detection is the ability for anomaly grouping framework 406 to learn a single anomaly pattern at a time by learning a cascade of unidimensional cut-offs (UCs). Each UC takes the following form:

feature-comparator-threshold where feature denotes one network metric/characteristic of interest (e.g., client count, interference, CPU usage, etc.), comparator is a comparison operator, such as largerThan, smallerThan, equal, and threshold is a cut-off value for the feature. For instance, an example of a UC is:

clientCount-largerThan-185

Thus, an anomaly pattern can be thought of as a chain of cutoffs, similar to the path from the root to a leaf of a decision tree in a random forest. It turns out that anomaly patterns are learned in a quite similar way to decision trees, but they are much more constrained in order to allow for excellent interpretability.

In some embodiments, anomaly grouping framework 406 may learn one anomaly pattern at a time, each of which is a set of UCs. Given the learning of one pattern, the next UC is learned on the subset of the dataset that fulfills the UCs learned so far for that pattern. For example, given the current set of UCs for the pattern being learned is:

{interference-largerThan-29, packetFailureRate-largerThan-0.87}

The next UCs will then be learned only on that portion of the dataset in the feature space that have an interference larger than 29 and a packet failure rate larger than 87%.

Anomaly grouping framework 406 may continually attempt to learn the UCs for an anomaly pattern until a stopping criterion is matched. Once this criterion is matched, anomaly grouping framework 406 may take the points fulfilling the set of UCs that define the current anomaly pattern and update their weights. For example, after identifying a given anomaly pattern from the sets of characteristics labeled as anomalous or non-anomalous, anomaly grouping framework 406 may apply exponential decay, zeroing, or another decaying approaches to these points, to weight these sets over time. By having the sets that contributed to a detected anomaly pattern decay in weight over time, this steers the attention of anomaly grouping framework 406 towards new samples in the dataset, thus letting the next patterns identify new anomaly groups.

The input dataset D is composed by the features/characteristics, the labels and, optionally, the weight of each sample. If a weighting is not applied, the samples may simply have a weighting of '1' by default. Pseudocode for the operations of anomaly grouping framework 406 is as follows, in various embodiments:

01. Collection of PATTERNs P←is initially empty
02. Sample weights SW←initialized using weights given as input or to '1' by default
03. Until all learned patterns P fulfill Patterns Stopping Criterion:
04. UCs collection defining the current pattern C-Pattern←is initialized to empty collection
05. Current dataset CD=D
06. Until UCs for C-Pattern fulfill Constraints Stopping Criterion:
07. Current UC C-UC←estimate a UC by training some classifier on CD given weights, SW
08. Update C-Pattern←by adding C-UC
09. Update CD←keep partition of CD that fulfills C-UC, discard the rest
10. Update P←adding C-Pattern
11. Update SW←by decaying weights of samples identified by C-Pattern
12. Return collection of learned patterns P It is to be noted that the above pseudocode refers to the first of the two kinds of potential outputs noted above that anomaly grouping framework 406 may generate. In case the desired output is instead a collection of UCs, it is also sufficient to change line 12 to instead return the UCs for the learned PATTERNs, instead.

Anomaly grouping framework 406 may use any number of different pattern and/or constraints stopping criteria can be used, in various embodiments. For example, one pattern stopping criterion in the above pseudocode may be "until all anomalies have been assigned to at least one group." In further embodiments, a constraints stopping criterion may indicate a performance metric, such as a specified recall or precision (e.g., "until C-PATTERN has reached a precision of X %."

As noted, estimating a UC (line 07 in the above pseudocode) may entail training one or more decision tree classifiers. This can entail, for example, anomaly grouping framework 406 learning a single stump classifier and casting that into a UC. In more robust embodiments, anomaly grouping framework 406 may estimate the UC by training a collection of simple classifiers (e.g., decision tree classifiers) in a bootstrapped fashion. In turn, anomaly grouping framework 406 may aggregate the results of the various classifiers to determine the UC. For example, anomaly grouping framework 406 may perform a majority vote among the classifiers and then estimate the UC/threshold by averaging the outputs (e.g., UCs/thresholds) of the individual classifiers.

FIGS. 5A-5F illustrate an example of learning an anomaly pattern, in various embodiments. For purposes of simplicity, only two network characteristics and, consequently, dimensions in the feature space, are shown. These characteristics are the average client signal to noise (SNR) ratio and client count measured for a given wireless access point in a network. However, as would be appreciated, the typical feature space in a network assurance service may include any number of different dimensions/characteristics. Also for illustrative purposes only, assume that the constraint stopping criterion is "pattern precision must be 100%."

In plot 500 in FIG. 5A, assume that anomaly grouping framework 406 has applied anomaly detection to various sets of the characteristics, to label each set as either "anomalous" or "non-anomalous," accordingly. In doing so, certain anomalies may exist within the same region of the feature space, thus indicating a potential anomaly pattern. Such a pattern can thus be defined by the cutoffs/thresholds for that region. As shown, the current anomaly pattern may be initialized to be an empty set, i.e., C-PATTERN={ }.

In plot 510 in FIG. 5B, now assume that anomaly grouping framework 406 has picked a threshold 512, to begin isolating anomalous sets of network characteristics in the features space. Implicitly, threshold 512 represents the UC of "client count larger than threshold 512." In turn, anomaly grouping framework 406 may add this UC to the current pattern by setting C-PATTERN={"client count larger than threshold 512"}.

In plot 520 in FIG. 5C, anomaly grouping framework 406 may then prepare the dataset for the next iteration by removing all points that do not satisfy the UC. In other words, as shown, any points/sets of characteristics that have a client count less than threshold 512 may be removed from consideration by anomaly grouping framework 406. In turn, anomaly grouping framework 406 may check whether the current pattern satisfies the constraint stopping criterion (e.g., pattern precision of 100%). However, as it stands, C-Pattern only has a precision equal to 3 points/(3+5 points)=0.375. In other words, since threshold 512 alone does not isolate out only anomalous points, the constraint stopping criterion has not been satisfied.

In plot 530 in FIG. 5D, anomaly grouping framework 406 may then use the non-removed points of data to pick a new UC. Notably, as shown, anomaly grouping framework 406 may identify threshold 514 as separating out the remaining anomalous points from that of the non-anomalous points. Threshold 514 also corresponds to a second UC of "average client SNR is greater than threshold 514" and anomaly grouping framework 406 may update the anomaly pattern to be C-PATTERN={"client count larger than threshold 512" and "SNR is greater than threshold 514"}.

In plot 540 in FIG. 5E, anomaly grouping framework 406 may again remove from consideration all points in the feature space that do not satisfy the second UC. Notably, anomaly grouping framework 406 may also remove the five remaining "non-anomalous" points from consideration, as these points all have average client SNRs that are below threshold 514.

In plot 550 in FIG. 5F, anomaly grouping framework 406 may evaluate its constraint stopping criteria that requires 100% precision, before it makes any attempt to perform another iteration over the feature space. As the only remaining points that satisfy both thresholds 512-514 are anomalous, this means that the stopping criteria is met and that anomaly grouping framework 406 can stop iterating. As a result, anomaly grouping framework 406 may define and output anomaly pattern 516 (e.g., in terms of UCs/thresholds 512-514. In order to favor the finding of multiple patterns within a dataset, after a pattern has been found, anomaly grouping framework 406 may apply a weighting/decay function to the points fulfilling the pattern under consideration shown in FIG. 5F, so as to decrease their weighting pattern after pattern, in this way steering the attention towards new sets of anomalies. Anomaly causation analyzer 408 may then proceed to identify other anomaly patterns in the feature space (e.g., the pattern of anomalies shown in the bottom left of plot 550). In turn, the set of UCs that define anomaly pattern 516 can be potentially used for root cause analysis of the anomaly pattern.

Any appropriate change to the network may be made by the network assurance service, based on an identified anomaly pattern. For example, in the case where a given wireless access point or set of APs presents an anomaly pattern when the average client SNR is greater than a first threshold and the number of clients is greater than a second threshold, one potential change to the network would be to decrease the number of allowed clients of the AP(s) to below the second threshold. This change may be made either directly by the service (e.g., via automation and feedback controller 316) or indirectly, such as by first presenting data regarding the anomaly pattern to an administrator that selects the appropriate corrective measure.

A prototype using the techniques herein was constructed in Python and a given UC learned as a depth-1 decision tree. More precisely, in the prototype, a bootstrapping approach was used to generate a set of models at each iteration. The set of models were then used for robustly deciding which descriptor is the best to pick (e.g., by majority voting among the classifiers) and averaging the actual cutoff (e.g., by averaging the thresholds output by the individual classifier models).

The patterns stopping criterion in the prototype was implemented as follows:

Patterns Stopping Criterion="Until all anomalies have been assigned to at least one pattern"

A range of Constraints Stopping Criteria was also implemented in the prototype to reflect the following:

"Until pattern has reached a minimum precision of X %"

"Until pattern identifies a minimum number A of anomalies"

"Until pattern has included at most N constraints"

The prototype was then run on datasets of different sizes, on the order of $10^3$ access points, for time frames ranging from 1 week to 8 months, and on different use cases, meaning anomalies of different natures (e.g., radio resets, onboarding anomalies, etc.), and using different sets of descriptors. Examples of patterns identified by the prototype with their associated precisions are as follows:

Example pattern for onboarding use case:
{clientCount—largerThan—183.1,
averageNumberOfAssocFailuresPerClient—largerThan—1.6,
maxSecondsAssocSequence—largerThan—190 s}

The precision of this pattern is 82.26%. The ground truth cause behind the anomalies caught by this pattern is the fact that the access points reach the maximum number of clients that they can onboard (200), and this pattern correctly points to this situation by grouping anomalies that all have a client count close to this limit.

Example of pattern for radio reset use case:
{interferenceDrop—largerThan—74.3,
packageFailureRate—largerThan—0.002}

The precision of this pattern is 94.7%. In this case, the pattern identifies a set of radio resets, happening in access points that all had a high interference in a recent past, which suddenly dropped.

Figure 6:
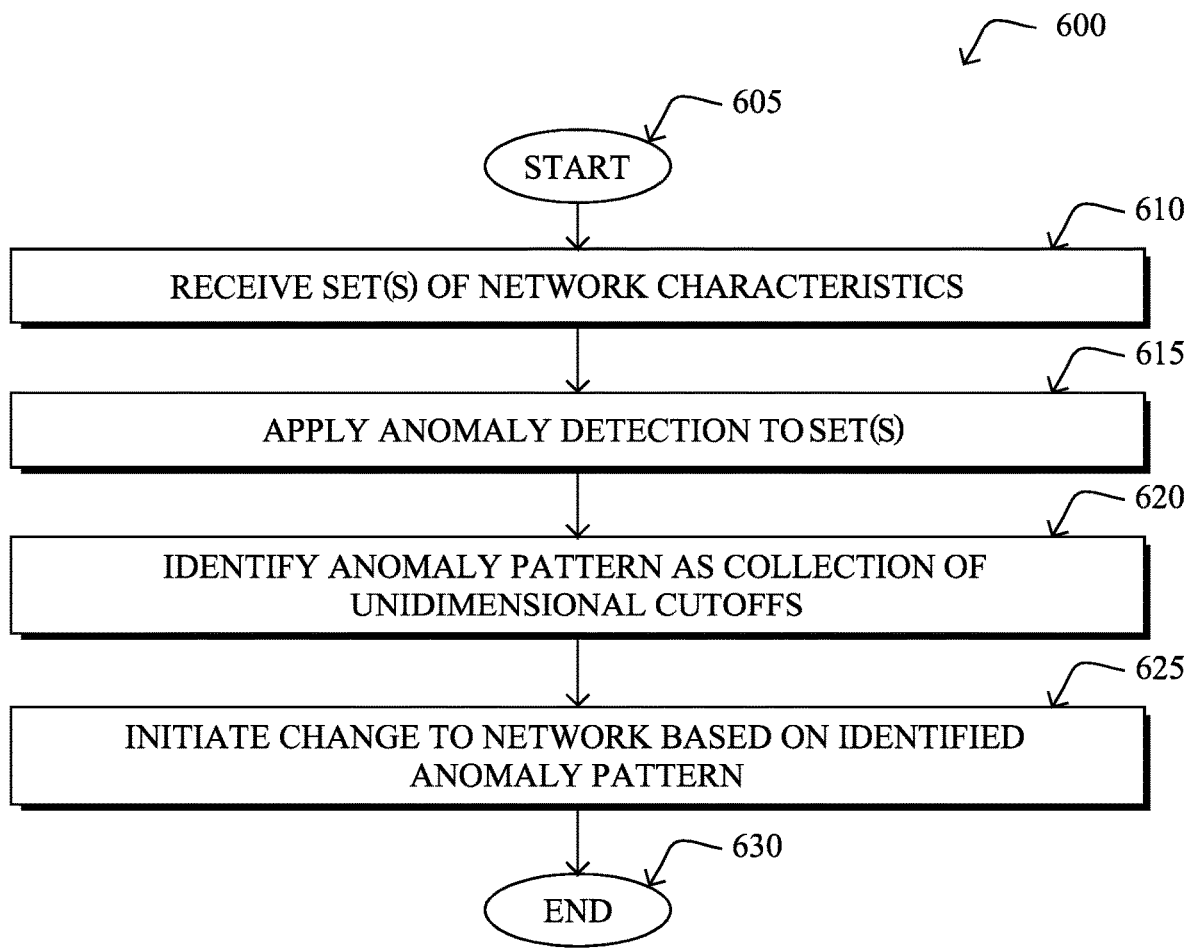
FIG. 6 illustrates an example simplified procedure for learning an anomaly pattern.

FIG. 6 illustrates an example simplified procedure for learning an anomaly pattern in a network, in accordance with one or more embodiments described herein. For example, a non-generic, specifically configured device (e.g., device 200) may perform procedure 600 by executing stored instructions (e.g., process 248), to implement a network assurance service. The procedure 600 may start at step 605, and continues to step 610, where, as described in greater detail above, the network assurance service may receive one or more sets of network characteristics of a network, each network characteristic forming a different feature dimension in a multi-dimensional feature space. In general, such characteristics may be any include any information regarding the performance, configuration, and/or state of the network monitored by the network assurance service. Such information may be in its raw state, may be anonymized, and/or may be transformed into a common data model, in various embodiments. Typically, the one or more sets may be characteristics indicative of a particular point in time in the network.

At step 615, as detailed above, the network assurance service may apply machine learning-based anomaly detection to the one or more sets of network characteristics. As a result, each set of network characteristics that is analyzed by the anomaly detector may be labeled as anomalous or non-anomalous/normal. For example, an anomaly detector may be trained on what is considered to be normal behavior in the network and compare the sets of network characteristics to this model. Any set that statistically differs from the model (e.g., greater than a predefined anomaly threshold) may then be labeled as anomalous.

At step 620, the network assurance service may identify, based on the labeled one or more sets of network characteristics, an anomaly pattern as a collection of unidimensional cutoffs in the feature space, according to various embodiments. In some embodiments, the service may train a single decision tree classifier to identify a particular cutoff (e.g., a dividing threshold in the feature space that separates some anomalous sets from other sets). In further embodiments, the service may train a plurality of such classifiers (e.g., a random forest) and aggregate their results, to determine a cutoff. For example, the service may perform voting among the classifiers and average their outputs, to determine the cutoff in a single dimension. In various embodiments, the service may continue to identify cutoffs for an anomaly pattern until a specified criterion is reached (e.g., a specified precision or recall for the pattern, etc.).

At step 625, as detailed above, the network assurance service may initiate a change to the network based on the identified anomaly pattern. In some embodiments, the service may send display data indicative of the identified anomaly pattern to a user interface, so as to allow an administrator to select the appropriate changes. In other embodiments, depending on the anomaly pattern, the network assurance service may initiate the change automatically, such as by changing a device configuration in the monitored network (e.g., adjusting the maximum number of clients that can be attached to an AP, etc.). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an efficient and highly interpretable method to jointly group and summarize anomaly patterns found in a monitored network, which can sequentially train cascades of simple group patterns. In other aspects, the same training approach can be used to produce a collection of outputs for use as tags from other data mining processes, which build groups based on frequent pattern mining.

While there have been shown and described illustrative embodiments that provide for generating rules (e.g., thresholds/UCs) for causation analysis of network anomalies, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a network assurance service, one or more sets of network characteristics of a network, each network characteristic forming a different feature dimension in a multi-dimensional feature space;
   applying, by the network assurance service, machine learning-based anomaly detection to the one or more sets of network characteristics, to label each set of network characteristics as anomalous or non-anomalous;
   identifying, by the network assurance service and based on the labeled one or more sets of network characteristics, a plurality of anomaly patterns, each anomaly pattern including a plurality of unidimensional cutoffs in the feature space; and
   initiating, by the network assurance service, a change to the network based on the identified plurality of anomaly patterns,
   wherein the identifying of the plurality of anomaly patterns comprises:
   identifying, by the network assurance service, a first anomaly pattern including a first plurality of unidimensional cutoffs in the feature space; and
   identifying, by the network assurance service, one or more subsequent anomaly patterns, each of which including a subsequent plurality of unidimensional cutoffs in the feature space that satisfy the first plurality of unidimensional cutoffs of the first anomaly pattern, until a stopping criterion is met.

2. The method as in claim 1, wherein identifying the plurality of anomaly patterns comprises:
   training, by the network assurance service and using the labeled one or more sets of network characteristics as training data, a machine learning-based classifier to output a cutoff for a particular dimension in the feature space.

3. The method as in claim 1, wherein identifying the plurality of anomaly patterns comprises:
   training, by the network assurance service and using the labeled one or more sets of network characteristics as training data, a plurality of machine learning-based classifiers to output cutoffs for a particular dimension in the feature space; and
   identifying, by the network assurance service, a particular unidimensional cutoff in the feature space as an average of the cutoffs output by the plurality of trained classifiers.

4. The method as in claim 1, wherein the change to the network comprises at least one of: assigning a wireless access point to a different channel, replacing network equipment, or adjusting resource reservations in the network to satisfy a service level agreement.

5. The method as in claim 1, wherein initiating the change to the network based on the identified plurality of anomaly patterns comprises:
 sending, by the network assurance service, display data indicative of the identified plurality of anomaly patterns to a user interface.

6. The method as in claim 1, further comprising:
 applying, by the network assurance service, weights to the one or more sets of network characteristics using a decay function.

7. The method as in claim 1, wherein the network characteristics are indicative of one or more of: client count for a wireless access point, interference information for the wireless access point, channel information for the wireless access point, or traffic information for traffic associated with the wireless access point.

8. The method as in claim 1, wherein identifying the plurality of anomaly patterns comprises:
 assessing, by the network assurance service, different potential cutoffs for a particular dimension in the feature space as one of the unidimensional cutoffs, until a stopping criterion is met.

9. The method as in claim 8, wherein the stopping criterion indicates at least one of: a precision or recall for any of the plurality of anomaly patterns.

10. An apparatus, comprising:
 one or more network interfaces to communicate with a network;
 a processor coupled to the network interfaces and configured to execute one or more processes; and
 a memory configured to store a process executable by the processor, the process when executed configured to:
  receive one or more sets of network characteristics of a network, each network characteristic forming a different feature dimension in a multi-dimensional feature space;
  apply learning-based anomaly detection to the one or more sets of network characteristics, to label each set of network characteristics as anomalous or non-anomalous;
  identify, based on the labeled one or more sets of network characteristics, a plurality of anomaly patterns, each anomaly pattern including plurality of unidimensional cutoffs in the feature space; and
  initiate a change to the network based on the identified plurality of anomaly patterns,
 wherein the identifying of the plurality of anomaly patterns comprises:
  identifying, by the network assurance service, a first anomaly pattern including a first plurality of unidimensional cutoffs in the feature space; and
  identifying, by the network assurance service, one or more subsequent anomaly patterns, each of which including a subsequent plurality of unidimensional cutoffs in the feature space that satisfy the first plurality of unidimensional cutoffs of the first anomaly pattern, until a stopping criterion is met.

11. The apparatus as in claim 10, wherein the apparatus identifies the plurality of anomaly patterns by:
 training, using the labeled one or more sets of network characteristics as training data, a machine learning-based classifier to output a cutoff for a particular dimension in the feature space.

12. The apparatus as in claim 10, wherein the apparatus identifies the plurality of anomaly patterns by:
 training, using the labeled one or more sets of network characteristics as training data, a plurality of machine learning-based classifiers to output cutoffs for a particular dimension in the feature space; and
 identifying a particular unidimensional cutoff in the feature space as an average of the cutoffs output by the plurality of trained classifiers.

13. The apparatus as in claim 10, wherein the change to the network comprises at least one of: assigning a wireless access point to a different channel, replacing network equipment, or adjusting resource reservations in the network to satisfy a service level agreement.

14. The apparatus as in claim 10, wherein the apparatus initiates the change to the network based on the identified plurality of anomaly patterns by:
 sending display data indicative of the identified plurality of anomaly patterns to a user interface.

15. The apparatus as in claim 10, wherein the process when executed is further configured to:
 apply weights to the one or more sets of network characteristics using a decay function.

16. The apparatus as in claim 10, wherein the network characteristics are indicative of one or more of: client count for a wireless access point, interference information for the wireless access point, channel information for the wireless access point, or traffic information for traffic associated with the wireless access point.

17. The apparatus as in claim 10, wherein the apparatus identifies the plurality of anomaly patterns by:
 assessing different potential cutoffs for a particular dimension in the feature space as one of the unidimensional cutoffs, until a stopping criterion is met.

18. The apparatus as in claim 17, wherein the stopping criterion indicates at least one of: a precision or recall for any of the plurality of anomaly patterns.

19. A tangible, non-transitory, computer-readable medium storing program instructions that cause a network assurance service to execute a process comprising:
 receiving, at the network assurance service, a plurality of one or more sets of network characteristics of a network, each network characteristic forming a different feature dimension in a multi-dimensional feature space;
 applying, by the network assurance service, machine learning-based anomaly detection to the one or more sets of network characteristics, to label each set of network characteristics as anomalous or non-anomalous;
 identifying, by the network assurance service and based on the labeled one or more sets of network characteristics, a plurality of anomaly patterns, each anomaly pattern including a plurality of unidimensional cutoffs in the feature space; and
 initiating, by the network assurance service, a change to the network based on the identified plurality of anomaly patterns,
 wherein the identifying of the plurality of anomaly patterns comprises:
  identifying, by the network assurance service, a first anomaly pattern including a first plurality of unidimensional cutoffs in the feature space; and
  identifying, by the network assurance service, one or more subsequent anomaly patterns, each of which including a subsequent plurality of unidimensional cutoffs in the feature space that satisfy the first plurality of unidimensional cutoffs of the first anomaly pattern, until a stopping criterion is met.

20. The computer-readable medium as in claim 19, wherein identifying the plurality of anomaly patterns comprises:

assessing, by the network assurance service, different potential cutoffs for a particular dimension in the feature space as one of the unidimensional cutoffs, until a stopping criterion is met.

* * * * *